United States Patent
Wang

(10) Patent No.: US 10,616,982 B1
(45) Date of Patent: Apr. 7, 2020

(54) SINGLE LIVE-WIRE POWER FETCHING SYSTEM CAPABLE OF PREVENTING FLICKERING AND ENHANCING POWER FETCHING EFFICIENCY

(71) Applicant: LOONG YEE INDUSTRIAL CORP., LTD., New Taipei (TW)

(72) Inventor: Chi-Jen Wang, New Taipei (TW)

(73) Assignee: LOONG YEE INDUSTRIAL CORP., LTD., New Taipei (TW)

( * ) Notice: Subject to any disclaimer, the term of this patent is extended or adjusted under 35 U.S.C. 154(b) by 0 days.

(21) Appl. No.: 16/559,628

(22) Filed: Sep. 4, 2019

(51) Int. Cl.
  *H05B 33/00* (2006.01)
  *H05B 45/10* (2020.01)
  *H05B 45/37* (2020.01)
  *H02M 7/06* (2006.01)

(52) U.S. Cl.
  CPC .............. *H05B 45/10* (2020.01); *H05B 45/37* (2020.01); *H02M 7/06* (2013.01)

(58) Field of Classification Search
  CPC ............ H05B 33/0815; H05B 33/0845; H05B 33/0803; H05B 33/0857; H05B 33/089; H05B 33/0884; H05B 33/0887; H05B 37/0272; H05B 33/0812; H05B 33/0851; H05B 37/0245; H05B 37/0263; H05B 37/0227; H05B 33/0809; H05B 33/0863; H05B 39/048; H05B 39/08; H05B 33/083; H05B 33/0896; H05B 37/0281; H05B 6/105; H05B 33/0818; H05B 33/0824; H05B 33/0866; H05B 37/02; H05B 39/041; H05B 33/08; H05B 33/0827; H05B 33/0842; H05B 33/0854; H05B 37/0218; H05B 39/044; H05B 33/0821; H05B 33/086; H05B 33/0872; H05B 37/0209; H05B 37/03; H05B 37/036; H05B 39/00; H05B 39/045; H05B 39/105

See application file for complete search history.

(56) References Cited

U.S. PATENT DOCUMENTS

2007/0040516 A1* 2/2007 Chen ..................... H05B 39/045
                                                                          315/291
2018/0279429 A1* 9/2018 Sadwick ................ H05B 33/08

* cited by examiner

*Primary Examiner* — Monica C King
(74) *Attorney, Agent, or Firm* — Chun-Ming Shih

(57) ABSTRACT

A single live-wire power fetching system capable of preventing flickering and enhancing power fetching efficiency, that includes a single live-wire power fetching switch module, a High Side Buck ac/dc, and a multifunction rectifying unit. The single live-wire power fetching module is provided with a live-wire input end and a live-wire output end, connected in series to a single live-wire to perform single live-wire power fetching, and to supply power for normal operation of circuits in the single live-wire power fetching switch module. The High Side Buck ac/dc is used to provide part of power for single live-wire power fetching, with input end of the High Side Buck ac/dc connected in parallel to the single live-wire power fetching switch module through multifunction rectifying unit, and with output end of the High Side Buck ac/dc connected to the single live-wire power fetching switch module to provide power.

8 Claims, 7 Drawing Sheets

SINGLE LIVE-WIRE POWER FETCHING SYSTEM CAPABLE OF PREVENTING FLICKERING AND ENHANCING POWER FETCHING EFFICIENCY

BACKGROUND OF THE INVENTION

Field of the Invention

The preferred embodiment of the present invention relates to the single live-wire power fetching applications, and in particular to a single live-wire power fetching system capable of preventing flickering and enhancing power fetching efficiency.

The Prior Arts

Presently, the electronic switch sold on the market can be a 3-wire Lighting Systems (N wire, live wire, and lamp wire) type electronic switch, or a 2-wire Lighting Systems (live wire/lamp wire) type electronic switch. Since the conventional electronic switch is of a 2-wire type (live wire/lamp wire) configuration without having an N wire, so that when a user brings home a 3-wire type electronic switch to use, he will be at a loss to find out no matching N phase wire circuit is provided at home for installation, therefore causing quite inconvenience to the user.

Moreover, the 2-wire Lighting Systems type electronic switch utilizes series-connected single live-wire to fetch power, such that in application, minute amount current will pass through the lamp, to cause flickering of the lamp. Especially, in case the 2-wire Lighting Systems type electronic switch is utilized for an LED lamp, the flickering of the LED lamp is more evident and significant, thus causing troubles to the users in application.

As shown in FIGS. 6 and 7, in a single live-wire power fetching switch 10 of the Prior Art, a conventional non-insulated half-wave rectifying High Side Buck ac/dc 20 can be used with a single light-emitting diode D7. Due to insufficient design, the imbalance of overall voltage could cause voltage drifting for the waveform levels of AC power supplies at two ends, to cause flickering of LED lamp. Based on real tests, it is found that, when the energy level of the AC power supplies at two ends exceed the flicker triggering AC level FV as indicated by the arrows shown in FIG. 7, lamp flickering is sure to occur.

Presently, the solution to this problem is that, a resistor, a 0.1 uF/250 VAC capacitor, or a 0.33 uF/250 VAC capacitor is connected across two ends of the LED lamp. In this respect, in order to enable the single live-wire power fetching switch 10 to fetch sufficient working power, additional electronic elements must be provided in matching. However, basically, this kind of remedy is not satisfying, since it could cause inconvenience in installation, while adding complexity to the indoor power distribution.

Therefore, now the problem of eliminating flickering of LED lamp poses a great challenge to the installation and usage of intelligent switch. And that is the crucial factor in determining if the intelligent switch can be sold on the market. Therefore, right now there is an urgent need to improve this problem and overcome the bottleneck, so that the single live-wire power fetching can be used in providing power to the Internet of Things (IOT) and the intelligent switch.

Therefore, presently, the design and performance of the power fetching system is not quite satisfactory, and it leaves much room for improvement.

SUMMARY OF THE INVENTION

In view of the problems and drawbacks of the prior art, the preferred embodiment of the present invention provides a single live-wire power fetching system capable of preventing flickering and enhancing power fetching efficiency, that includes a single live-wire power fetching switch module, a High Side Buck ac/dc, and a multifunction rectifying unit.

The single live-wire power fetching switch module is provided with a live-wire input end and a live-wire output end, to be connected in series to a single live-wire to perform single live-wire power fetching, and to supply power for normal operations of circuits in the single live-wire power fetching switch module.

The High Side Buck ac/dc is used to provide part of power for single live-wire power fetching, with an input end of the High Side Buck ac/dc connected in parallel to the single live-wire power fetching switch module through the multifunction rectifying unit, and with an output end of the High Side Buck ac/dc connected to the single live-wire power fetching switch module to provide power.

The multifunction rectifying unit is connected in series to the input end of the High Side Buck ac/dc, and to be connected to the live-wire input end of the single live-wire power fetching switch module. Wherein, the multifunction rectifying unit includes: a non-isolated half-wave rectifier, with a positive end of the non-isolated half-wave rectifier connected to the live-wire input end; a flickering prevention voltage regulator, connected in parallel to the positive end of the non-isolated half-wave rectifier; and an enhanced power fetching waveform regulator, connected in series between a negative end of the non-isolated half-wave rectifier and the input end of the High Side Buck ac/dc.

Summing up the above, in a preferred embodiment of the present invention, the non-isolated half-wave rectifier and the High Side Buck ac/dc are utilized to prevent flickering of LED lamp through using a special circuit design. In addition, the multifunction rectifier unit is capable of obtaining more than 50% of the fetched power, that is quite sufficient to drive 5G and Wi-Fi. And this could fulfill the power required for the Internet of Things (IoT) and intelligent switch control through single live-wire power fetching.

Further scope of the applicability of the present invention and embodiments thereof will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

Embodiments of the present invention are described below, by way of example only, with reference to the accompanying drawings; in which.

DETAILED DESCRIPTION OF THE PREFERRED EMBODIMENT

Figure 1:
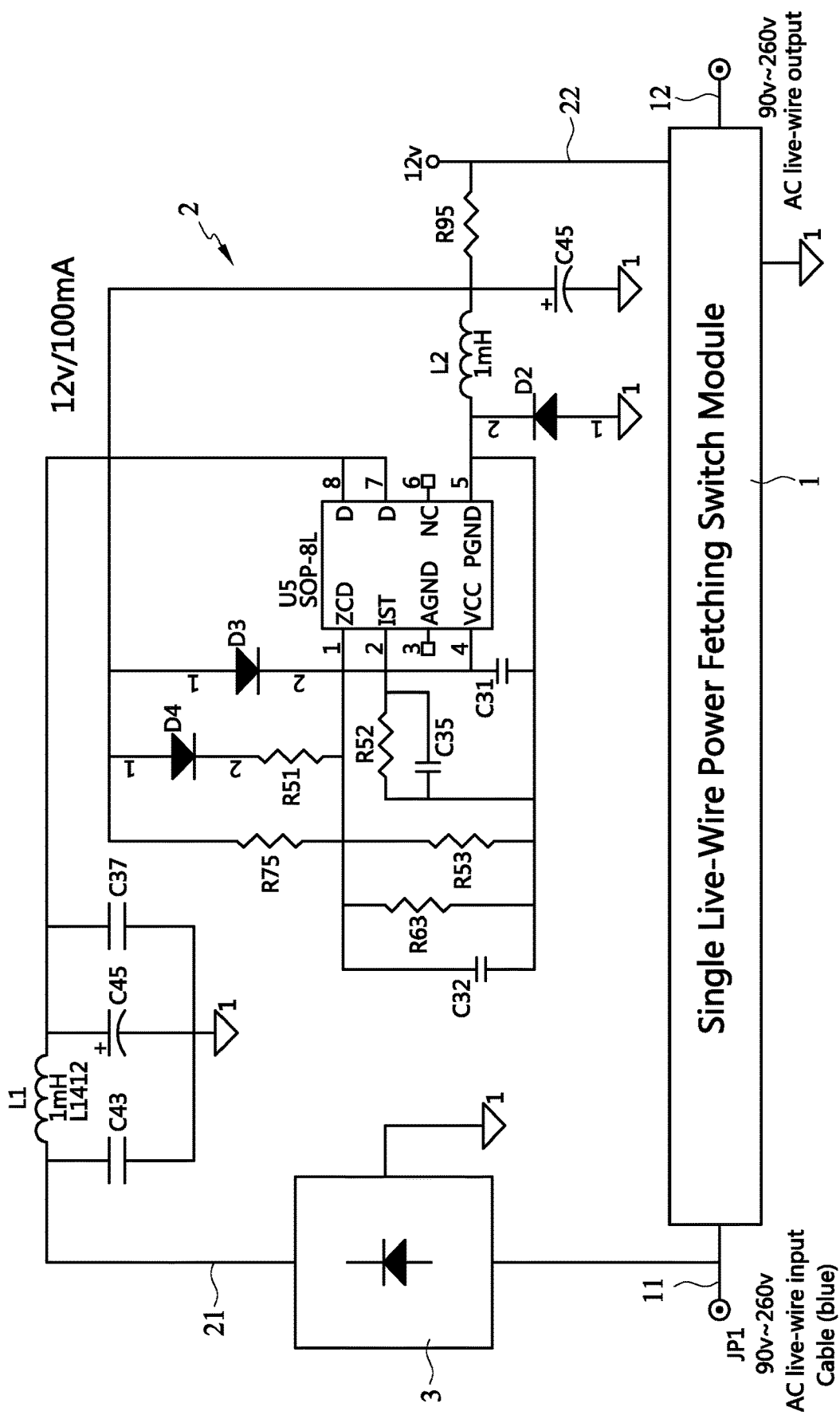
FIG. 1 is an equivalent circuit diagram of a single live-wire power fetching system capable of preventing flickering and enhancing power fetching efficiency according to the present invention.

The purpose, construction, features, functions and advantages of the present invention and its embodiments can be appreciated and understood more thoroughly through the following detailed descriptions with reference to the attached drawings.

Refer to FIGS. 1 to 5 respectively for an equivalent circuit diagram of a single live-wire power fetching system capable of preventing flickering and enhancing power fetching efficiency according to the present invention; a circuit diagram of a single live-wire power fetching system capable of preventing flickering and enhancing power fetching efficiency according to the present invention; an operation wave form diagram of a flickering prevention voltage regulator according to the present invention; an operation wave form diagram of an enhanced power fetching waveform regulator according to the present invention; an operation waveform diagram for enhanced power fetching according to the present invention.

As shown in FIGS. 1 to 5, the present invention provides a single live-wire power fetching system capable of preventing flickering and enhancing power fetching efficiency, that includes: a single live-wire power fetching switch module 1, a High Side Buck ac/dc 2, and a multifunction rectifying unit 3.

The single live-wire power fetching switch module 1 is provided with a live-wire input end 11 and a live-wire output end 12, to be connected in series to a single live-wire to perform single live-wire power fetching, and to supply power for normal operation of circuits in the single live-wire power fetching switch module 1.

The High Side Buck ac/dc 2 is used to provide part of power for single live-wire power fetching, with an input end 21 of the High Side Buck ac/dc 2 connected to a live-wire input end 11 of the single live-wire power fetching switch module 1 through the multifunction rectifying unit 3, and is connected in parallel with the single live-wire power fetching switch module 1, and with an output end 22 of the High Side Buck ac/dc 2 connected to the single live-wire power fetching switch module 1 to provide power.

The multifunction rectifying unit 3 is connected in series to the input end 21 of the High Side Buck ac/dc 2, to be connected to the live-wire input end 11 of the single live-wire power fetching switch module 1. Wherein, the multifunction rectifying unit 3 includes at least: a non-isolated half-wave rectifier 31, with a positive end of the non-isolated half-wave rectifier 31 connected to the live-wire input end 11; a flickering prevention voltage regulator 32, connected in parallel to the positive end of the non-isolated half-wave rectifier 31; and an enhanced power fetching waveform regulator 33, connected in series between a negative end of the non-isolated half-wave rectifier 31 and the input end 11 of the High Side Buck ac/dc 2.

Figure 2:
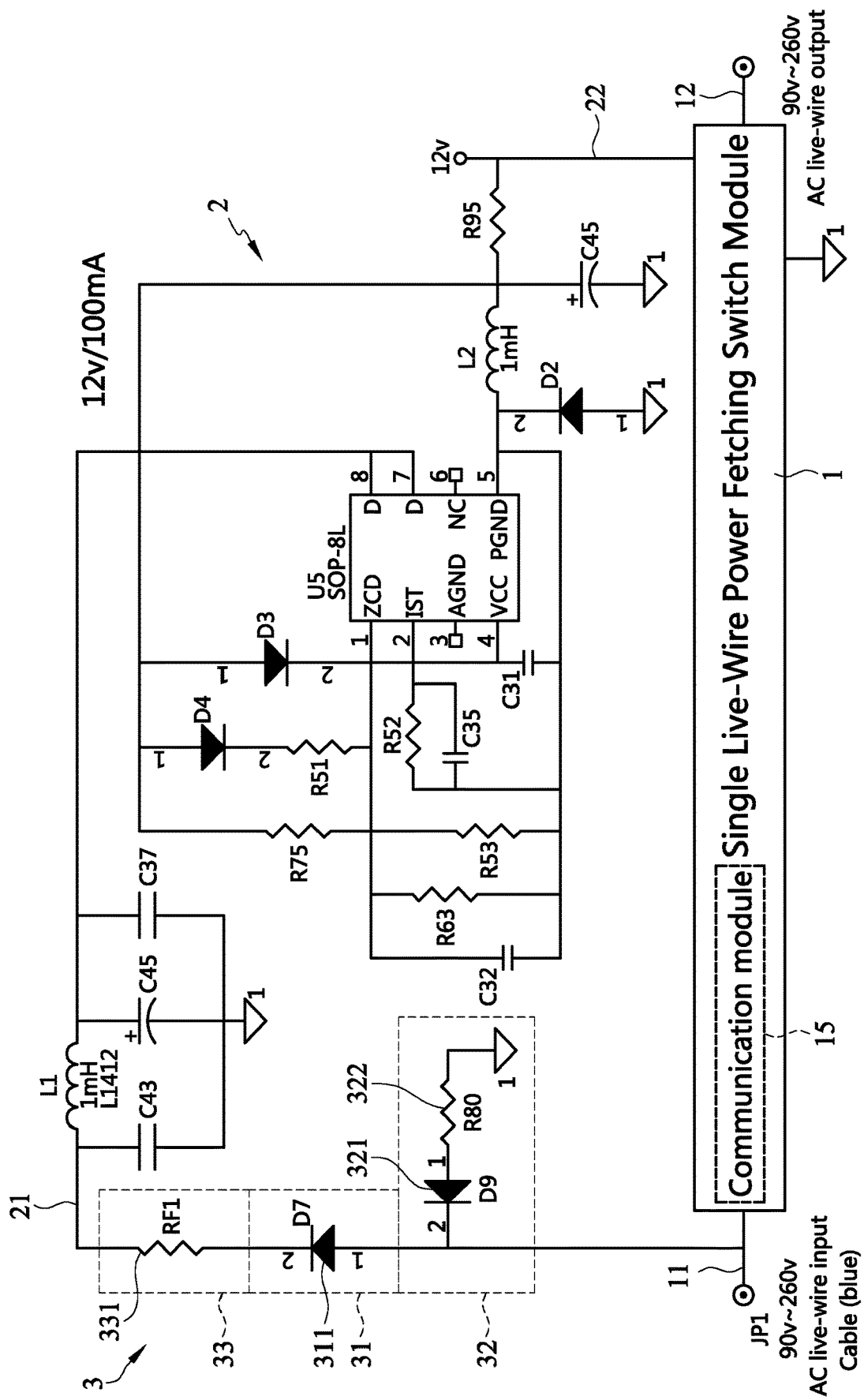
FIG. 2 a circuit diagram of a single live-wire power fetching system capable of preventing flickering and enhancing power fetching efficiency according to the present invention.

Preferably, as shown in FIG. 2, the non-isolated half-wave rectifier 31 can be formed by at least a diode 311, but the present invention is not limited to this. The enhanced power fetching waveform regulator 33 can be formed by at least a resistor 331, but the present invention is not limited to this. The flickering prevention voltage regulator 32 can be formed by at least a diode 321 and a resistor 322 connected in series. One end of the resistor 322 is connected to ground, while the other end of the resistor 322 is connected to the positive end of the diode 321, and negative end of the diode 321 is connected to the positive end of the non-isolated half-wave rectifier 31, but the present invention is not limited to this.

Preferably, the multifunction rectifying unit 3 can be packaged into an integrated circuit module; or the High Side Buck ac/dc 2 and the multifunction rectifying unit 3 can be packaged into the integrated circuit module. As such, it can be installed and used simply and conveniently for the various different size live wire power fetching electronic switch.

Preferably, the single live-wire power fetching switch module 1 is an intelligent single live-wire power fetching switch, and the intelligent single live-wire power fetching switch can be imbedded into one of the followings: a communication module 15, a wireless Blue Tooth module, a wireless Zigbee module, a wireless Z-wave module, a wireless RF 2.4 G module, a wireless 3G module, a wireless 4G module, a wireless 5G module, a wireless 433 MHz module, and a wireless Wi-Fi network module.

Preferably, the inside (not shown) of the single live-wire power fetching switch module 1 is provided with at least two synchronous power fetching circuits connected in series, and they are in turn connected to an electronic switch respectively. Wherein, each of the two synchronous power fetching circuits connected in series includes a synchronous rectifying outside power supply unit, and a synchronous rectifying inside power supply unit, an alternative current (AC) synchronous voltage control unit, an FET driven zero-crossing control unit, a synchronous load dynamic adjusting unit, and an AC synchronous zero-crossing power fetching unit. The details of the components of the various units mentioned above and their operations are described in the previous application cases of the Applicant of the present invention. They are not the major technical characteristics of the present invention, thus they are omitted here for brevity.

Figure 3:
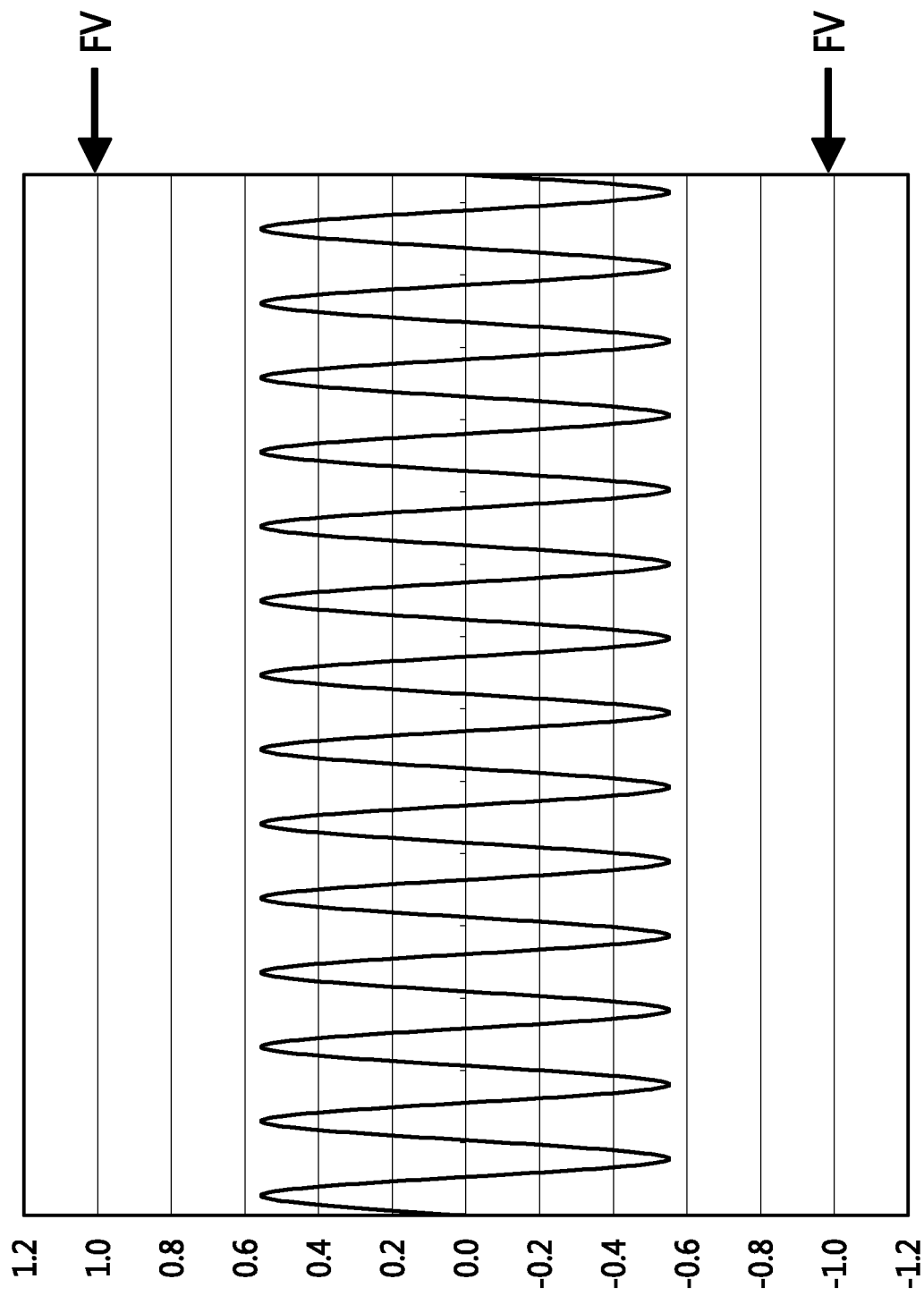
FIG. 3 is an operation waveform diagram of a flickering prevention voltage regulator according to the present invention.

As shown in FIGS. 1 to 3, since the positive end of the non-isolated half-wave rectifier 31 is connected to the flickering prevention voltage regulator 32, therefore, in application, the diode 321 and the resistor 322 can be used to improve and eliminate voltage drift of the single live-wire power fetching switch module 1. As such, when a plurality of LED lamps are installed and in operation, the power supplied can still be stabilized within the flicker triggering AC level FV for the LED lamp as shown by the arrows in FIG. 3. Since the peak value of the overall AC power supply does not exceed the level as indicated by the arrows, flickering of the LED lamp will not occur.

Figure 4:
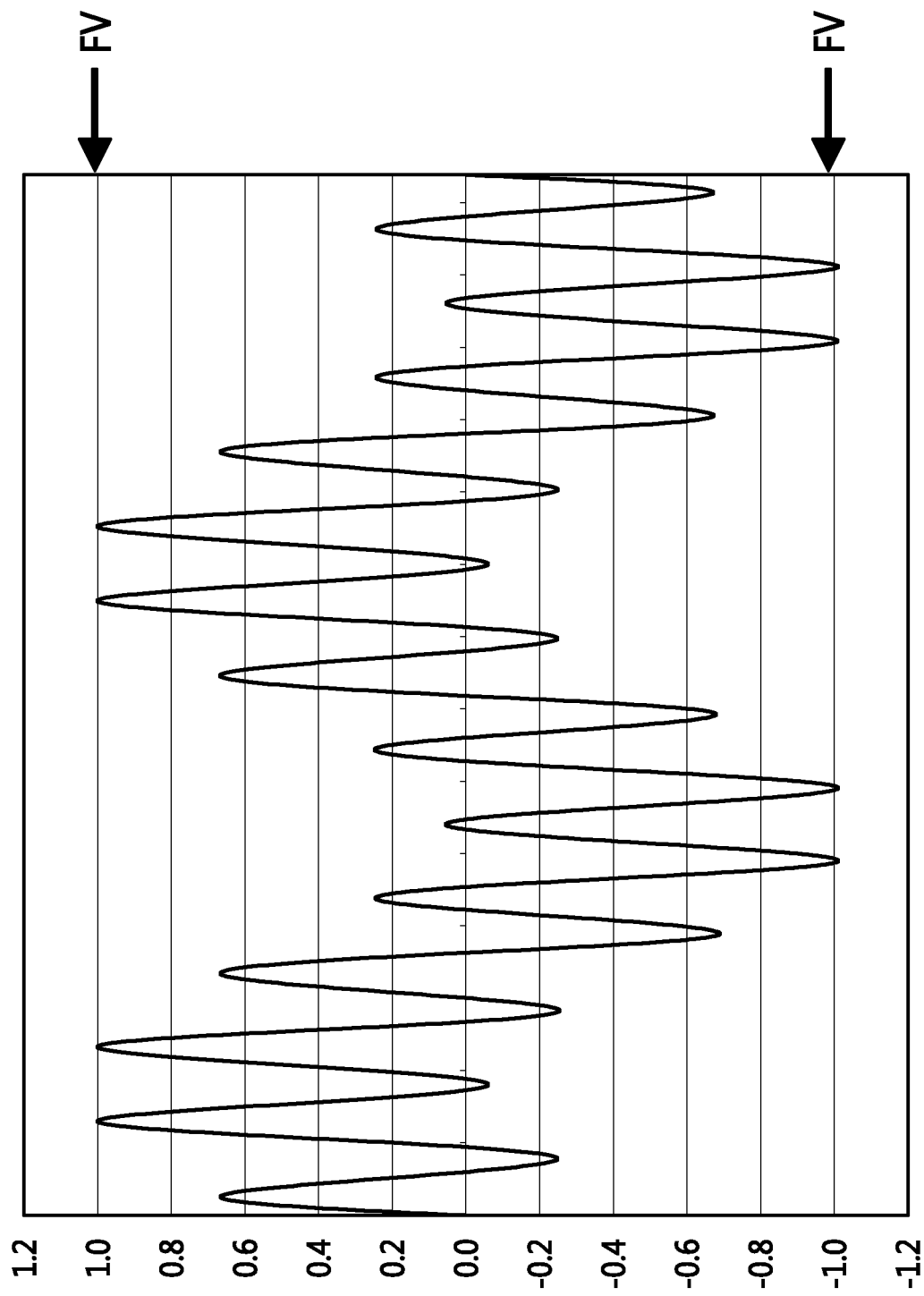
FIG. 4 is an operation waveform diagram of an enhanced power fetching waveform regulator according to the present invention.
Figure 5:
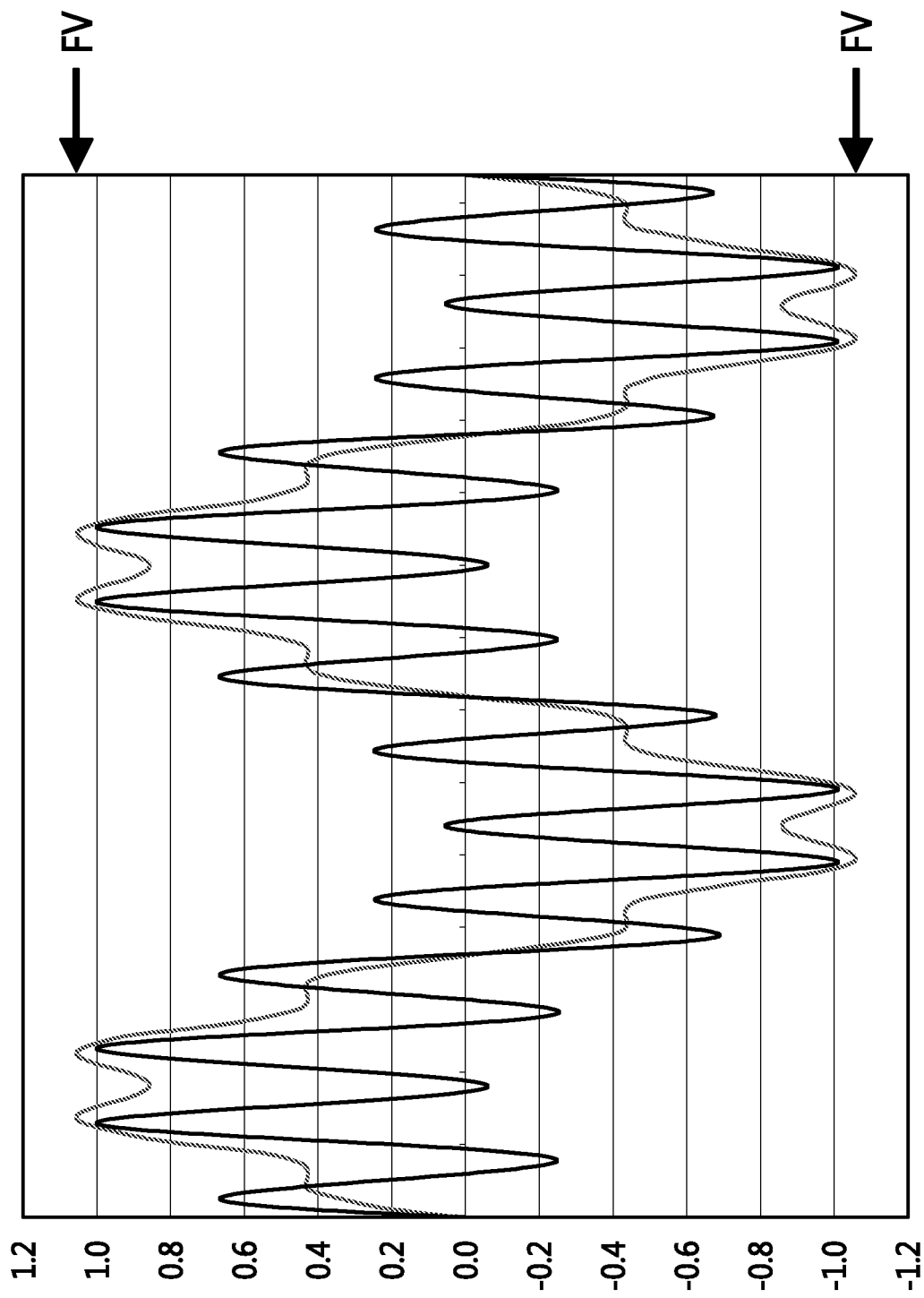
FIG. 5 is an operation waveform diagram for enhanced power fetching according to the present invention.
Figure 6:
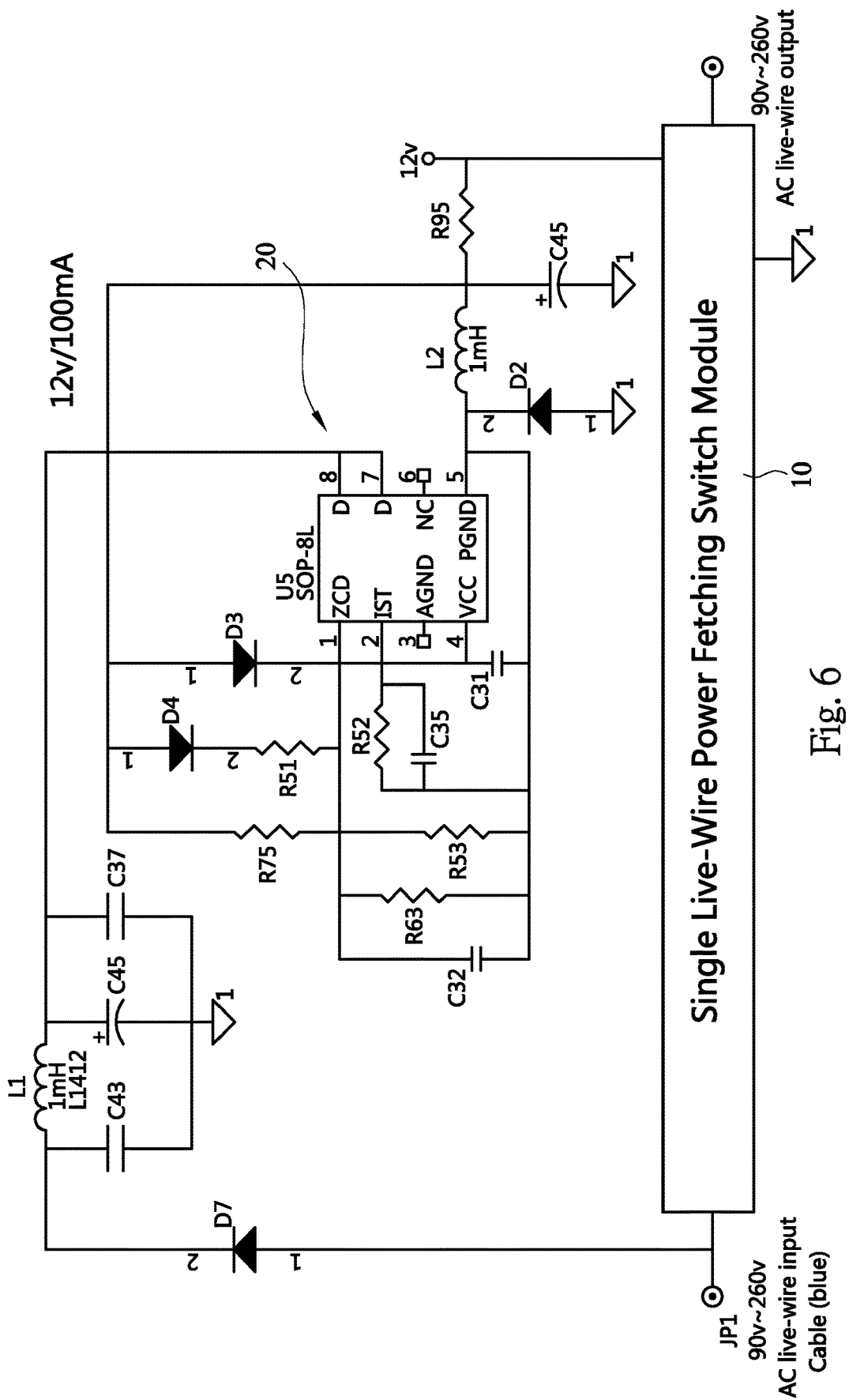
FIG. 6 a circuit diagram of a single live-wire power fetching switch according to the Prior Art.
Figure 7:
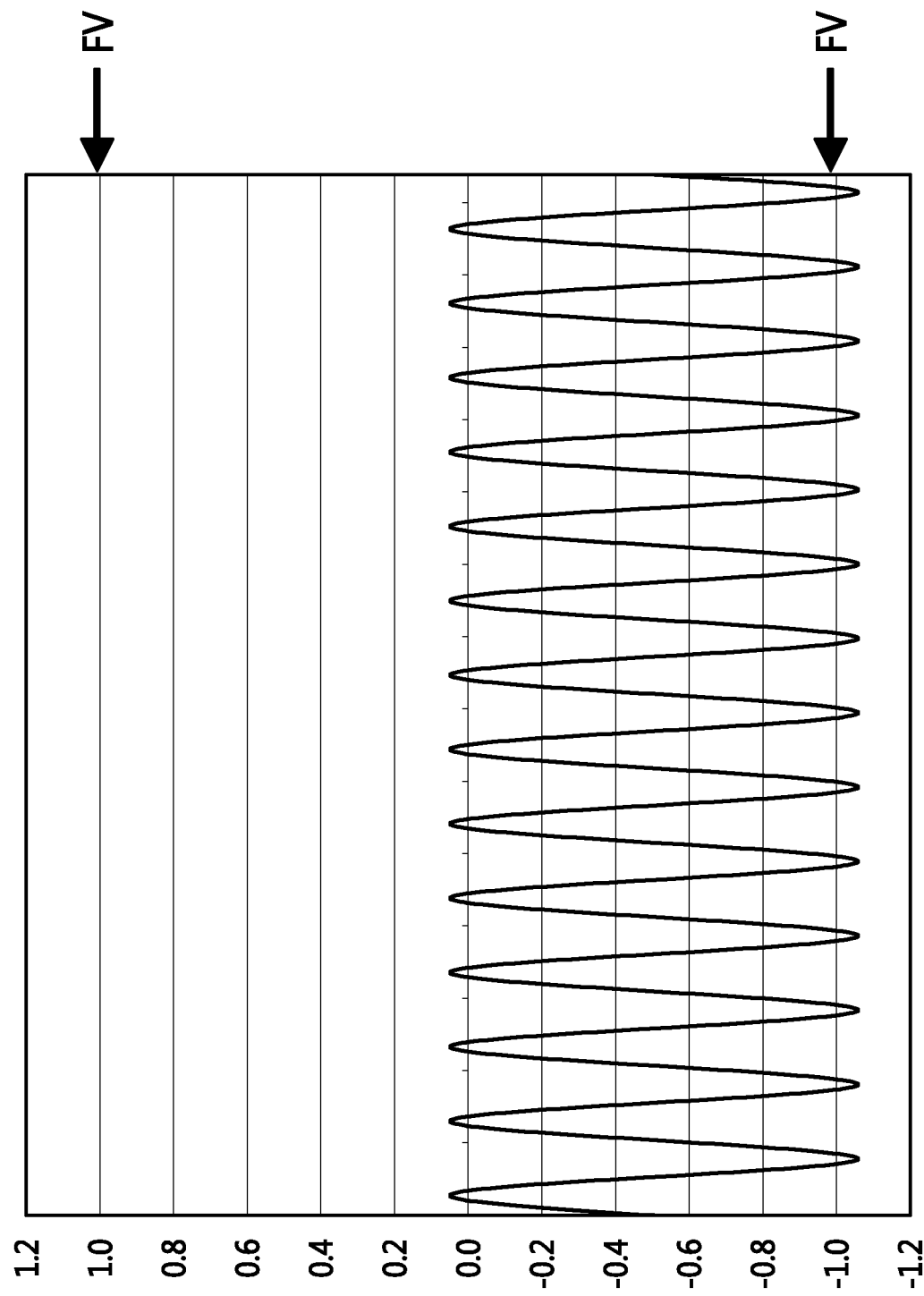
FIG. 7 is an operation waveform diagram of a non-isolated half-wave regulator and High End Buck ac/dc according to the Prior Art.

Further, as shown in FIGS. 2,4,5, in the preferred embodiment of the present invention, an enhanced power fetching waveform regulator 33 is disposed between a negative end of the non-isolated half-wave rectifier 31 and the input end 11 of the High Side Buck ac/dc 2, so that the resistor 321 connected in series is able to reduce the energy level for charging and discharging the LED lamp. Therefore, this could reduce effectively the charging and discharging cycle voltage level of the LED lamp circuit, as such the maximum up and down drifting peak values are restricted to within the flicker triggering AC level FV for the LED lamp as shown by the arrows in FIG. 4, and thus flickering of the LED lamp will not occur. Besides, when the single live-wire power fetching switch module 1 is used to supply power to the LED lamp of low load of 5 watts, the remaining energy is guided to the High Side Buck ac/dc 2, thus raising the power fetched by 50%.

As shown in FIG. 4, minute current tends to pass through the LED lamp, to cause cyclic charging and discharging of the LED lamp. The use of a series connected resistor 321 is able to reduce the energy level of the charging and discharging. As such, when the LED lamp is connected in series to the single live-wire power fetching switch module 1, the LED lamp could maintain normal conduction without incurring flickering.

In fact, the problem of LED lamp cyclic charging and discharging has existed for a long time, especially for the LED lamp having low load of 10 watts presently available on the market. Basically, its internal circuit has the shortcomings of insufficient power factor (far below 0.7), along with aging of the electronic components, the LED lamp flickering will happen sooner or later.

As shown in FIGS. 2 and 5, the preferred embodiment of the present invention makes use of an optimal design to modify directly the circuit of the single live-wire power fetching system, to reduce the voltage level required for the cyclic charging and discharging of the LED lamp. Further, it makes use of the voltage drifting caused by reduced voltage level for the cyclic charging and discharging of the LED lamp, to raise the power fetching by more than 50%. The fetched power thus obtained is supplied to the communication module 15 embedded in the single live-wire power fetching switch module 1, that includes one of the followings: a wireless Zigbee module, a wireless RF 2.4G module, a wireless Blue Tooth BLE4.2 module, a wireless Blue Tooth BLE5.0 module, and a wireless Z wave module.

Through the design of the present invention, the performance of two-wire intelligent switch is improved, while the LED lamp flickering caused by cyclic charging and discharging can be avoided. The advantages of the present invention can be summarized as follows:

1. In installing the single live-wire intelligent switch, there is no need to use an N phase wire loop, yet is still able to function normally;
2. In installing the single live-wire intelligent switch, there is no need to connect a capacitor or a resistor across the two ends of the LED lamp;
3. In installation, all it has to do is to replace a conventional two-wire switch directly with a single live-wire intelligent switch to realize normal operation; and
4. In the single live-wire intelligent switch, a special circuit is provided, to improve and eliminate effectively flickering of LED lamp caused by aging of the LED lamp.

Presently around the world, 95% conventional households utilize mechanical switch for single live-wire power distribution. In the future, when replacing the mechanical switch with an Internet of Things (IoT) dimmer switch by making use of Wi-Fi, there is no need to add a Neutral phase line to produce a power fetching circuit, the circuit design of the conventional household can be used to provide the same function. In this way, the system of the present invention can be added to the conventional household directly, to be upgraded to an Internet of Things (IoT) intelligent switch, in realizing energy saving effectively in households, schools and public buildings.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A single live-wire power fetching system capable of preventing flickering and enhancing power fetching efficiency, comprising:
    a single live-wire power fetching switch module, a High Side Buck ac/dc, and a multifunction rectifying unit, wherein
    the single live-wire power fetching module is provided with a live-wire input end and a live-wire output end, to be connected in series to a single live-wire to perform single live-wire power fetching, and to supply power for a normal operation of circuits in the single live-wire power fetching switch module;
    the High Side Buck ac/dc is used to provide part of power for single live-wire power fetching, with an input end of the High Side Buck ac/dc connected in parallel to the single live-wire power fetching switch module through the multifunction rectifying unit, and with an output end of the High Side Buck ac/dc connected to the single live-wire power fetching switch module to provide power;
    the multifunction rectifying unit is connected in series to the input end of the High Side Buck ac/dc, and to be connected to the live-wire input end of the single live-wire power fetching switch module, wherein
    the multifunction rectifying unit includes:
    a non-isolated half-wave rectifier, with a positive end of the non-isolated half-wave rectifier connected to the live-wire input end,
    a flickering prevention voltage regulator, connected in parallel to the positive end of the non-isolated half-wave rectifier, and
    an enhanced power fetching waveform regulator, connected in series between a negative end of the non-isolated half-wave rectifier and the input end of the High Side Buck ac/dc.

2. The single live-wire power fetching system capable of preventing flickering and enhancing power fetching efficiency as claimed in claim 1, wherein the multifunction rectifying unit is packaged into an integrated circuit module.

3. The single live-wire power fetching system capable of preventing flickering and enhancing power fetching efficiency as claimed in claim 1, wherein the High Side Buck ac/dc and the multifunction rectifying unit are packaged into the integrated circuit module.

4. The single live-wire bi-directional power fetching and dimmer control system as claimed in claim 1, wherein the non-isolated half-wave rectifier is formed by at least a diode, and the flickering prevention voltage regulator is formed by at least a resistor.

5. The single live-wire bi-directional power fetching and dimmer control system as claimed in claim 4, wherein the enhanced power fetching waveform regulator is formed by the diode connected in series with the resistor, wherein one end of the resistor is connected to ground, and the other end of the resistor is connected to a positive end of the diode, and a negative end of the diode is connected to the positive end of the diode for the non-isolated half-wave rectifier.

6. The single live-wire bi-directional power fetching and dimmer control system as claimed in claim 5, wherein the flickering prevention voltage regulator restricts a peak value of the regulated AC power supply to within a flicker triggering AC level of an LED lamp.

7. The single live-wire bi-directional power fetching and dimmer control system as claimed in claim 5, wherein the enhanced power fetching waveform regulator is used to reduce voltage level of charging and discharging cycles for a circuit of the LED lamp, so that maximum up and down drift waveform peak values are restricted to within the flicker triggering AC level of the LED lamp, and the remaining energy is guided into the series-connected High Side Buck ac/dc to increase power fetched at least 50%.

8. The single live-wire bi-directional power fetching and dimmer control system as claimed in claim 5, wherein the single live-wire power fetching switch module is an intelligent single live-wire power fetching switch, and the intelligent single live-wire power fetching switch is imbedded into one of the followings: a communication module, a wireless Blue Tooth module, a wireless Zigbee module, a wireless Z-wave module, a wireless RF 2.4 G module, a wireless 3G module, a wireless 4G module, a wireless 5G module, a wireless 433 MHz module, and a wireless Wi-Fi network module.

* * * * *